United States Patent [19]

Tsan

[11] Patent Number: 4,766,762
[45] Date of Patent: Aug. 30, 1988

[54] GAS REGULATOR WITH LEAKAGE-DETECTING DEVICE

[76] Inventor: Su-Li Tsan, No. 8, Alley 5, Lane 493, Chung Ho Street, Peitou District, Taipei, Taiwan

[21] Appl. No.: 932,194

[22] Filed: Nov. 14, 1986

[51] Int. Cl.[4] .............................................. G01M 3/28
[52] U.S. Cl. ................................................... 73/40
[58] Field of Search ................................ 73/40, 40.5 R

[56] References Cited

U.S. PATENT DOCUMENTS

| | | | |
|---|---|---|---|
| 3,027,916 | 4/1962 | Smith | 73/40 X |
| 3,106,835 | 10/1963 | Henderson | 73/40 X |
| 4,387,591 | 6/1983 | Corzine et al. | 73/40 X |

Primary Examiner—Stewart J. Levy
Assistant Examiner—Joseph W. Roskos
Attorney, Agent, or Firm—Browdy and Neimark

[57] ABSTRACT

A gas regulator provided with a leakage detecting device, which is adopted for depressurizing the supplied gas and detecting a leakage in the gas system. Above the pressure-reducing chamber of a conventional gas regulator the present leakage-detecting device is installed which is fixedly secured to the upper cap thereof. A sensing rack member of the present detecting device is disposed above and bears against a reinforcement plate and is actuated to move up and down along with a diaphragm associated with the reinforcement plate as a result of the gas pressure in the pressure-reducing chamber of the present regulator as well as the acting force of an pressure-adjusting spring so that gas leakage can be accordingly indicated thereby.

3 Claims, 3 Drawing Sheets

GAS REGULATOR WITH LEAKAGE-DETECTING DEVICE

BACKGROUND OF THE INVENTION

Gas leakage has always been an extremely dangerous and fatal problem to those people using gas as a fuel, and the leakage in the pipe line connecting a gas adjustor and a gas burner is often neglected by people. Moreover leakage often takes place without notice at the connection of a gas regulator and the valve of a gas reservoir as a result of loosely tightening of the same. Such leakage can surely result in a disaster.

In view of the serious problem, the inventor has devoted himself to the work of designing a gas regulator equipped with a leakage-detecting device which can effectively solve the problem.

SUMMARY OF THE INVENTION

The primary object of the present invention is to provide a gas regulator equipped with a leakage-detecting device which can ensure the tight sealing of the gas regulator to a gas burner, as well as to the valve of a gas reservoir.

One further object of the present invention is to provide a leakage-detecting means which is securely mounted inside a gas regulator and above a pressure-reducing chamber communicable to the atmosphere, so that it can reduce the chance of leakage in the pipe line due to the installation of the leakage-detecting device on the gas regulator. In a conventional gas regulator, a barometer is adopted to serve the purpose of detecting gas leakage, but this often causes leakage at the connection between the barometer and the pipe line. The present invention can effectively solve the above-cited problem accordingly.

BRIEF DESCRIPTION OF THE DRAWINGS

The features, structure and operational modes of the present invention will clearly emerge along with the accompanying drawings, in which.

DETAILED DESCRIPTION OF THE PREFERRED EMBODIMENTS

Figure 1B:
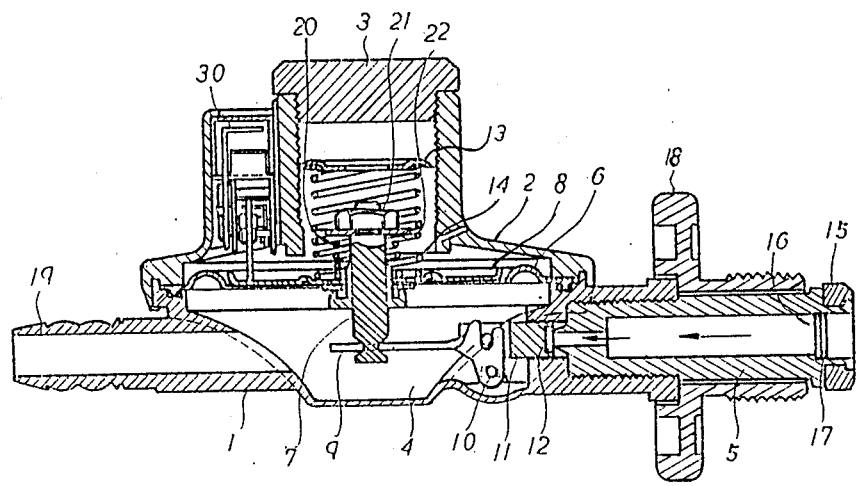
FIGS. 1A and 1B are sectional views of the present gas regulator with a leakage-detecting device.

FIG. 1 illustrates an assembly of the present gas regulator, which comprises an actuation diaphragm 6, fixedly secured to a central shaft 7 and having an reinforcement plate 8 disposed thereunder with a pressure-relief spring 20 disposed thereabove having a flat washer 22 on the top thereof, and a fixing nut 21 is used to get all the above-cited components assembled together to form a diaphragm unit. A pressure-adjustment spring 14, positioned inside a tubular housing of an upper cap 2 via the top opening thereof and fixed under a pressure adjusting screw 13 capable of adjusting the spring force thereof and covered under an openable cap member 3, is disposed above a pressure-reducing chamber 4 of an embodiment 1 and is housed inside the upper cap 2 and riveted to the embodiment 1.

Figure 1A:
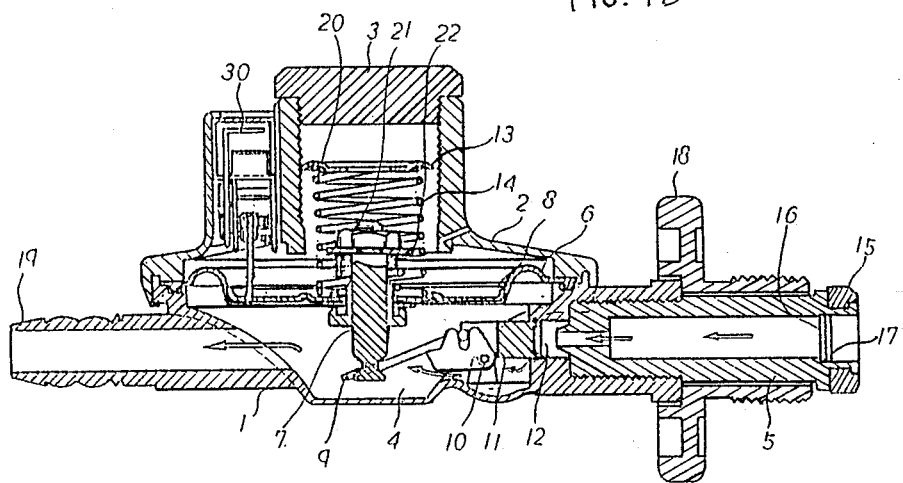
Figure 5:
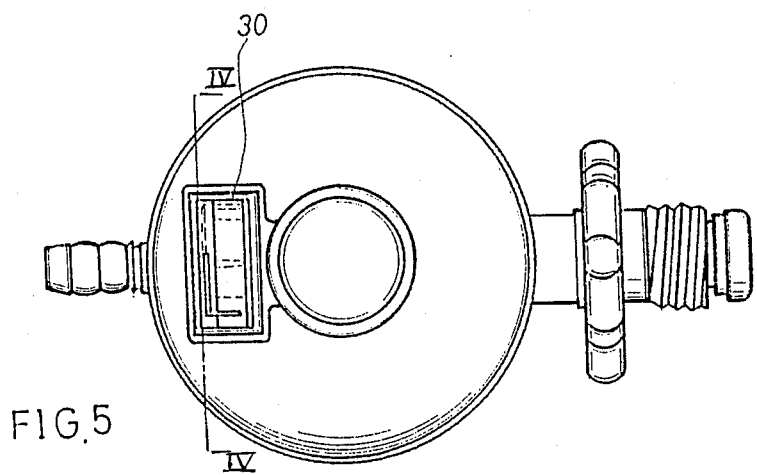
FIG. 5 is a top view of the present gas regulator.

As shown in FIGS. 1A and 1B, the leakage detecting means 30 is disposed inside a housing, placed next to the upper cap 2 and near the exit connecting duct 19, from the top thereof and secured to the flange of the housing, and a transparent viewing cover 41 is planted thereabove and riveted to the upper cap as shown in FIG. 5.

A detecting rack member 31 is pushed abutting against the reinforcement plate 8 due to the spring force of a resilient element 37 and can be synchronously actuated up and down along with the reinforcement plate 8 so to construct an upper part of the present regulator. The pressure-reducing chamber 4 takes up the lower portion thereof and coincides with the embodiment 1 of the present regulator, and at the right end of the embodiment 1 an inlet connecting duct 5 is positioned attached with a peripherally-flanged coupler 18, and with a plastic seal 15, a filter 16 and a stop spring 17 positioned at the frontmost end of the connecting duct 5.

A lever element 9, with its left end associated with the bottom end of the central shaft 7, and right end with a valve plunger 11 which is in registry with a valve 12, is fixed to the embodiment 1 by a pin element 10. On the left side of the embodiment 1 an exit connecting duct 19 is provided which is communicable to the inlet connecting duct 5.

The gas pressure in the pressure-reducing chamber as well as the acting force of the pressure adjustment spring 14 enables the central shaft 7 to move up and down in a reciprocating manner so to actuate the lever member 9 and the valve plunger 11 which is operated to move back and forth accordingly so to make the valve 12 open and close thereby, permitting the control of the gas influx into the pressure reducing chamber 4, and thereby effect the purpose, and the depressurized gas flows out of the exit connecting duct 19, the present gas regulator with a leakage-detecting means is so constructed.

Figure 3:
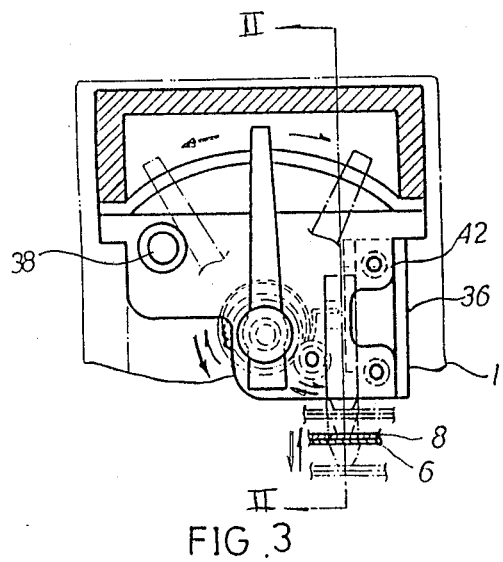
FIG. 3 is a front view of the present leakage-detecting device.
Figure 2:
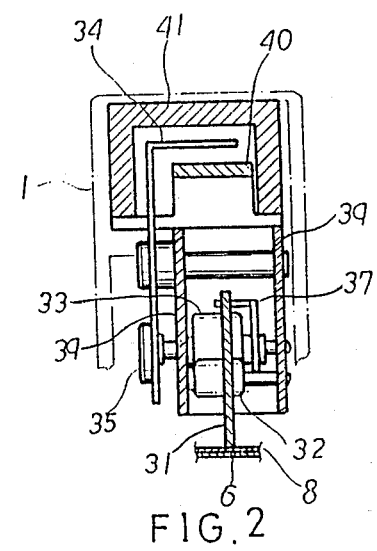
FIG. 2 is a sectional view of the present leakage-detecting device shown along the line II—II of FIG. 3.

Referring further to FIG. 2 and FIG. 3, the leakage-detecting means comprises a sensing rack member 31, a driven gear 32 and a pointer-actuating gear 33, assembled into a mechanism which is fixedly riveted to mounting boards 39, and a resilient element 37 is associated with both the pointer-actuating gear 33 and the sensing rack member 31 which is confined to moved up and down by a rack guide plate 36. The mounting boards are riveted together by a stop pin 42 as well as a fixing pin 38. Afterwards an L-shaped indicator board 40 is riveted to the mounting boards, and an L-shaped pointer 34 and a pointer fixing means 35 is secured to the shaft of the pointer-actuating gear 33. On the top of the assembly a transparent viewing cover 41 is disposed which is riveted to the upper cap so to shelter the same thereunder as shown in FIG. 5.

Figure 4:
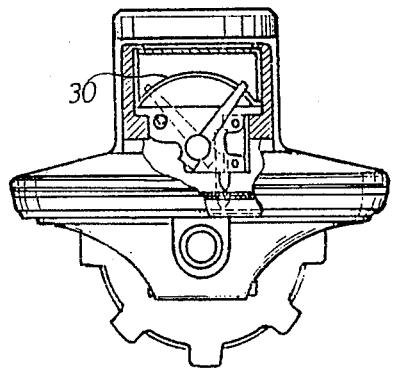
FIG. 4 is a left-side view of the present gas regulator provided with a leakage detecting device shown along the line IV—IV of FIG. 5.

In testing the leakage condition of the gas supply system including the regulator and the connecting pipe line, the gas control switch of the gas burner is first turned off, and open the master valve of the gas reservoir so to fill the regulator and its connecting pipe with gas. At this time, the pressure in the pressure-reducing chamber 4 is larger than the spring force of the pressure adjustment spring 14 so that the diaphragm unit is pushed upward as shown in FIG. 1, causing the central shaft 7 to move said lever member 9 which actuates said valve plunger 11 as well as the valve 12 to move to a closed position, and the pressure in the pressure-reducing chamber at present defines a close-state. As shown in FIGS. 2, 3 and 4, the driven gear 32 as well as the pointer actuating gear 33 is actuated to make the pointer 34 shift to the right side in a clockwise direction as a result of the movement of the diaphragm 6 as well as the reinforcement plate 8. At this moment, the valve to the reservoir is manually shut, in case there is no leakage in the pipe system, the pointer will remain at the position without moving, otherwise, the pointer will move to the left side due to the drop of the pressure in the pressure-reducing chamber 4, caused by the gas leakage thereof, which makes the spring force of the pressure-adjustment spring 14, disposed above the diaphragm 6 and the reinforcement plate 8, larger than the gas pressure in the chamber 4. Thus the diaphragm 6 and plate 8 are pushed to their lowest position thereby and the sensing rack member 31, abutting against the reinforcement plate 8 by means of the resilient element 37, can thus drive driven gear 32 as well as the pointer-actuating gear 33 to make the pointer 34 move counter-clockwisely to the left side of all indicator board 40. By way of the shift of all pointer, the gas leakage in the gas system can thereby be readily detected and cautious measures can be urgently taken to prevent a disaster from happening. In a normal gas supplying condition without leakage, the pointer of the leakage-detecting device will fluctuate at the middle of the indicator board 40 as shown in FIG. 3.

Figure 6:
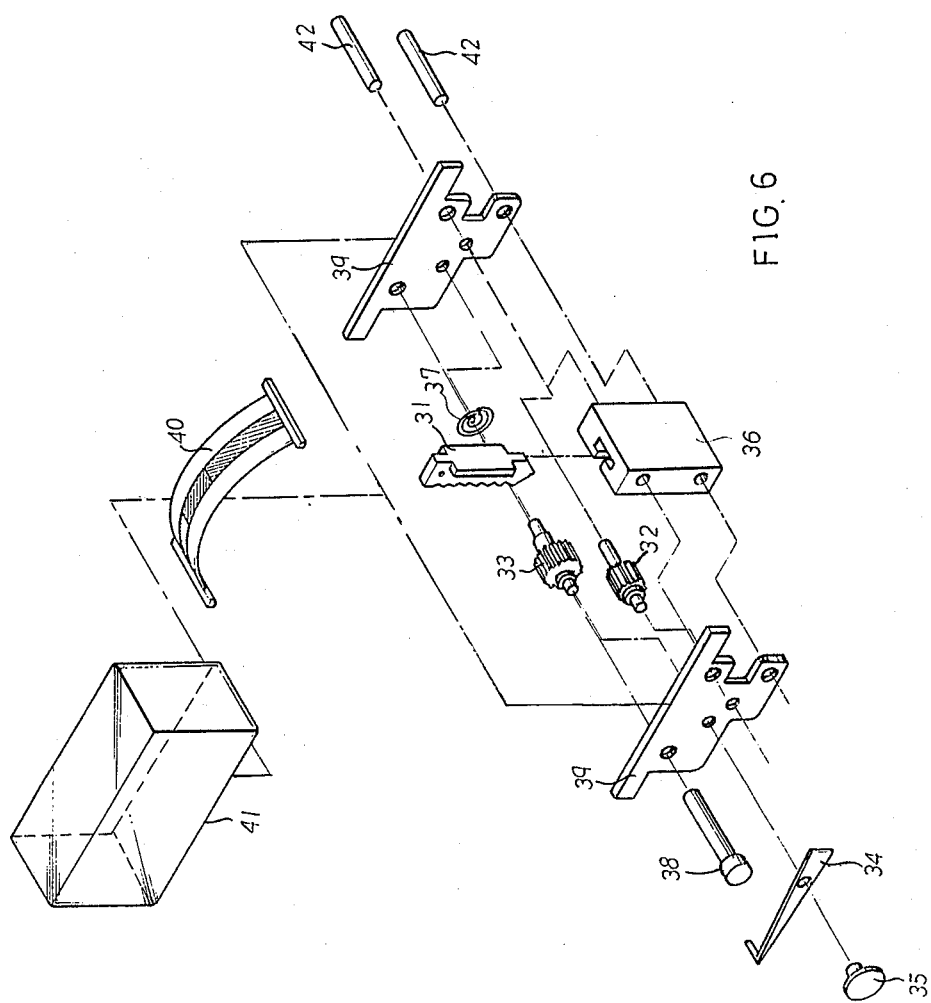
FIG. 6 is a detailed exploded view of the present leakage-detecting device.

FIG. 6 is an exploded detailed view illustrating the leakage detector according to the present invention. As can be seen in the drawings, the bottom side of the sensing rack member 31 is an abutment with the diaphragm 6. The rack-form side thereof is in engagement with gear 32 which is connected so as to actuate gear 33 to rotate so as to move pointer 34 accordingly.

To sum up, the present invention provides a gas regulator that is equipped with a simply-structured, readily-installed leakage detecting device housed inside the upper cap of the present gas regulator without influencing the normal function thereof.

I claim:

1. A gas regulator comprising:
   a housing having an exit connecting duct and a transparent viewing cover connected to a top portion of the housing;
   a pressure-reducing chamber disposed within said housing;
   a leakage-detecting means for depressurizing the supplied gas and detecting leakage in a gas supply line, said leakage-detecting means being located in said housing and fixed to an upper cap of said housing by means of fixing flanges, said leakage-detecting means being disposed above said pressure-reducing chamber and at a side of the exit connecting duct, said leakage-detecting means comprising:
   a reinforcement plate;
   a resilient element;
   a diaphragm;
   a pressure-adjustment spring;
   a sensing rack member fixed in an abutting relationship with said reinforcement plate by means of said resilient element such that said sensing rack member is able to move up and down in synchronism with said diaphragm and said reinforcement plate in response to actuation of said pressure-adjustment spring and gas pressure in said pressure-reducing chamber;
   a driven gear operatively connected to a pointer-actuating gear and responsive to movement of said sensing rack member;
   pointer means adapted to swing to the left and right in a fluctuating manner along an indicator board responsive to said driven gear and the pointer-actuating gear, whereby gas leakage can be detected from the swinging condition of said pointer means.

2. The gas regulator as claimed in claim 1, wherein said leakage-detecting means comprises a transmitting mechanism comprising said sensing rack member, said driven gear and said pointer-actuating gear, said transmitting mechanism being fixed on mounting boards bound together by means of a stop pin and a fixing pin, said leakage-detecting means further comprising a resilient element associated with said pointer-actuating gear and said sensing rack member which is confinedly guided by a rack guide plate to move in an up and down manner, the indicator board has an arc-shape and is riveted to said mounting boards, and said pointer means comprises an L-shaped pointer and a fixing means secured to a shaft of said pointer actuating gear to form an indicator with the transparent viewing cover positioned thereabove.

3. The gas regulator as claimed in claim 1, wherein said leakage-detecting device is fixed in position by means of flange means disposed in said housing, and said pointer is adapted to be viewed in a leakage checking process from said indicator board.

* * * * *